US011924696B2

(12) United States Patent
Talukdar

(10) Patent No.: US 11,924,696 B2
(45) Date of Patent: Mar. 5, 2024

(54) REDUCING TRAFFIC INTERRUPTION DURING HANDOVER

(71) Applicant: Nokia Technologies Oy, Espoo (FI)

(72) Inventor: Anup Talukdar, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 197 days.

(21) Appl. No.: 17/407,655

(22) Filed: Aug. 20, 2021

(65) Prior Publication Data

US 2022/0110027 A1    Apr. 7, 2022

Related U.S. Application Data

(60) Provisional application No. 63/086,315, filed on Oct. 1, 2020.

(51) Int. Cl.
*H04W 4/00* (2018.01)
*H04W 36/00* (2009.01)

(52) U.S. Cl.
CPC .............................. *H04W 36/0055* (2013.01)

(58) Field of Classification Search
CPC ................................................. H04W 36/0055
See application file for complete search history.

(56) References Cited

U.S. PATENT DOCUMENTS

| RE46,714 E | * | 2/2018 | Park | .................. | H04L 17/00 |
| 2020/0259896 A1 | * | 8/2020 | Sachs | .................. | H04J 3/0667 |
| 2022/0110027 A1 | * | 4/2022 | Talukdar | ........... | H04W 36/0055 |

FOREIGN PATENT DOCUMENTS

EP    2880911 B1  *  11/2016    ........ H04W 36/0055

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.
"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
"Control Plane handling and procedures to support Dual Connectivity Role Switch (DCRS) based HO", 3GPP TSG-RAN WG2 Meeting #105, R2-1900359, Agenda: 11.9.2, Qualcomm Incorporated, Feb. 25-Mar. 1, 2019, 4 pages.
"Single active protocol stack and dual active protocol stacks to reduce HO interruption", 3GPP TSG-RAN WG2 Meeting #105, R2-1900443, Agenda: 12.3.2, Mediatek Inc, Feb. 25-Mar. 1, 2019, 6 pages.
"3rd Generation Partnership Project; Technical Specification Group Radio Access Network; NG-RAN; Architecture description (Release 16)", 3GPP TS 38.401, V16.1.0, Mar. 2020, pp. 1-50.

(Continued)

*Primary Examiner* — Thai D Hoang
(74) *Attorney, Agent, or Firm* — Robert P. Michal, Esq.; Carter, DeLuca & Farrell LLP

(57) ABSTRACT

A method may include receiving, by a user equipment, a handover command from a source network entity. The method may further include, based on the received handover command, monitoring, by the user equipment, at least one dedicated downlink transmission from a target network entity prior to transmitting any uplink signal to the target network entity.

2 Claims, 15 Drawing Sheets

(56) References Cited

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104, V17.2.0, Dec. 2019, pp. 1-76.

"3rd Generation Partnership Project; Technical Specification Group Radio Access Network; NR; Requirements for support of radio resource management (Release 16)", 3GPP TS 38.133, V16.3.0, Mar. 2020, pp. 1169 pages.

* cited by examiner

REDUCING TRAFFIC INTERRUPTION DURING HANDOVER

RELATED APPLICATION

The present application claims priority from US Provisional Application No. 63/086315, filed 1 Oct. 2020.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for coordinating immediate delivery of downlink data packets as they arrive.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system may be built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 50, which may provide radio access for NR, LTE, and LTE-A. It is noted that the nodes in 50 providing radio access functionality to a user equipment (e g , similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some embodiments, a method may include receiving, by a user equipment, a handover command from a source network entity. The method may further include, based on the received handover command, monitoring, by the user equipment, at least one dedicated downlink transmission from a target network entity prior to transmitting any uplink signal to the target network entity.

In accordance with certain embodiments, an apparatus may include means for receiving a handover command from a source network entity. The apparatus may further include means for, based on the received handover command, monitoring at least one dedicated downlink transmission from a target network entity prior to transmitting any uplink signal to the target network entity.

In accordance with various embodiments, an apparatus may include at least one processor and at least one memory including computer program code. The at least one memory and the computer program code may be configured to, with the at least one processor, cause the apparatus to at least receive a handover command from a source network entity. The at least one memory and the computer program code may be further configured to, with the at least one processor, cause the apparatus to at least, based on the received handover command, monitor at least one dedicated downlink transmission from a target network entity prior to transmitting any uplink signal to the target network entity.

In accordance with some embodiments, a non-transitory computer readable medium may be encoded with instructions that may, when executed in hardware, cause an apparatus to perform a method. The method may include receiving a handover command from a source network entity. The method may further include, based on the received handover command, monitoring at least one dedicated downlink transmission from a target network entity prior to transmitting any uplink signal to the target network entity.

In accordance with certain embodiments, a computer program product may cause an apparatus to perform a method. The method may include receiving a handover command from a source network entity. The method may further include, based on the received handover command, monitoring at least one dedicated downlink transmission from a target network entity prior to transmitting any uplink signal to the target network entity.

In accordance with various embodiments, an apparatus may include circuitry configured to receive a handover command from a source network entity. The circuitry may further be configured to, based on the received handover command, monitor at least one dedicated downlink transmission from a target network entity prior to transmitting any uplink signal to the target network entity.

In accordance with some embodiments, a method may include receiving, by a first network entity from a second network entity, a handover request for a user equipment, the handover request indicating that downlink data delivery during a handover procedure should be configured by the first network entity for the user equipment. The method may further include configuring, by the first network entity, at least one radio bearer for the downlink data delivery during the handover procedure of the user equipment. The method may further include transmitting, by the first network entity, a handover acknowledgement to the second network entity. The method may further include transmitting, by the first network entity, at least one data packet dedicated for the user equipment to the user equipment, prior to receiving any uplink signal from the user equipment.

In accordance with certain embodiments, an apparatus may include means for receiving a handover request for a user equipment from a second network entity, the handover request indicating that downlink data delivery during a handover procedure should be configured by the apparatus for the user equipment. The apparatus may further include means for configuring at least one radio bearer for the downlink data delivery during the handover procedure of the user equipment. The apparatus may further include means for transmitting a handover acknowledgement to a second network entity. The apparatus may further include means for transmitting at least one data packet dedicated for the user equipment to the user equipment, prior to receiving any uplink signal from the user equipment.

In accordance with various embodiments, an apparatus may include at least one processor and at least one memory including computer program code. The at least one memory and the computer program code may be configured to, with the at least one processor, cause the apparatus to at least receive a handover request for a user equipment from a second network entity, the handover request indicating that downlink data delivery during a handover procedure should be configured by the apparatus for the user equipment. The at least one memory and the computer program code may be further configured to, with the at least one processor, cause the apparatus to at least configure at least one radio bearer for the downlink data delivery during the handover procedure of the user equipment. The at least one memory and the computer program code may be further configured to, with the at least one processor, cause the apparatus to at least transmit a handover acknowledgement to the second network entity. The at least one memory and the computer program code may be further configured to, with the at least one processor, cause the apparatus to at least transmit at least one data packet dedicated for the user equipment to the user equipment, prior to receiving any uplink signal from the user equipment.

In accordance with some embodiments, a non-transitory computer readable medium may be encoded with instructions that may, when executed in hardware, cause an apparatus to perform a method. The method may include receiving a handover request for a user equipment, the handover request indicating that downlink data delivery during a handover procedure should be configured by the apparatus for the user equipment. The method may further include configuring at least one radio bearer for the downlink data delivery during the handover procedure of the user equipment. The method may further include transmitting a handover acknowledgement to a second network entity. The method may further include transmitting at least one data packet dedicated for the user equipment to the user equipment, prior to receiving any uplink signal from the user equipment.

In accordance with certain embodiments, a computer program product may cause an apparatus to perform a method. The method may include receiving a handover request for a user equipment, the handover request indicating that downlink data delivery during a handover procedure should be configured by the apparatus for the user equipment. The method may further include configuring at least one radio bearer for the downlink data delivery during the handover procedure of the user equipment. The method may further include transmitting a handover acknowledgement to a second network entity. The method may further include transmitting at least one data packet dedicated for the user equipment to the user equipment, prior to receiving any uplink signal from the user equipment.

In accordance with various embodiments, an apparatus may include circuitry configured to receive a handover request for a user equipment, the handover request indicating that downlink data delivery during a handover procedure should be configured by the apparatus for the user equipment. The circuitry may further be configured to configure at least one radio bearer for the downlink data delivery during the handover procedure of the user equipment. The circuitry may further be configured to transmit a handover acknowledgement to a second network entity. The circuitry may further be configured to transmit at least one data packet dedicated for the user equipment to the user equipment, prior to receiving any uplink signal from the user equipment.

In accordance with some embodiments, a method may include transmitting, by a source network entity to a target network entity, a handover request indicating that at least one radio bearer for data delivery from the target network entity to a user equipment during a handover procedure of the user equipment should be configured. The method may further include receiving, by the source network entity, at least one handover acknowledgement from the target network entity. The method may further include transmitting, by the source network entity, a handover command to the user equipment. The method may further include transmitting, by the source network entity, packets for the user equipment to the target network entity.

In accordance with certain embodiments, an apparatus may include means for transmitting a handover request to a target network entity, the handover request indicating that at least one radio bearer for data delivery from the target network entity to a user equipment during a handover procedure of the user equipment should be configured. The apparatus may further include means for receiving at least one handover acknowledgement from the target network entity. The apparatus may further include means for transmitting a handover command to the user equipment. The apparatus may further include means for transmitting packets for the user equipment to the target network entity.

In accordance with various embodiments, an apparatus may include at least one processor and at least one memory including computer program code. The at least one memory and the computer program code may be configured to, with the at least one processor, cause the apparatus to at least transmit a handover request to a target network entity, the handover request indicating that at least one radio bearer for data delivery from the target network entity to a user equipment during a handover procedure of the user equipment should be configured. The at least one memory and the computer program code may be further configured to, with the at least one processor, cause the apparatus to at least receive at least one handover acknowledgement from the target network entity. The at least one memory and the computer program code may be further configured to, with the at least one processor, cause the apparatus to at least transmit a handover command to the user equipment. The at least one memory and the computer program code may be further configured to, with the at least one processor, cause the apparatus to at least transmit packets for the user equipment to the target network entity.

In accordance with some embodiments, a non-transitory computer readable medium may be encoded with instructions that may, when executed in hardware, cause an apparatus to perform a method. The method may include transmitting a handover request to a target network entity, the handover request indicating that at least one radio bearer for data delivery from the target network entity to a user equipment during a handover procedure of the user equipment should be configured. The method may further include receiving at least one handover acknowledgement from the target network entity. The method may further include transmitting a handover command to the user equipment. The method may further include transmitting packets for the user equipment to the target network entity.

In accordance with certain embodiments, a computer program product may cause an apparatus to perform a method. The method may include transmitting a handover request to a target network entity, the handover request indicating that at least one radio bearer for data delivery from the target network entity to a user equipment during a handover procedure of the user equipment should be configured. The method may further include receiving at least one handover acknowledgement from the target network entity. The method may further include transmitting a handover command to the user equipment. The method may further include transmitting packets for the user equipment to the target network entity.

In accordance with various embodiments, an apparatus may include circuitry configured to transmit a handover request to a target network entity, the handover request indicating that at least one radio bearer for data delivery from the target network entity to a user equipment during a handover procedure of the user equipment should be configured. The circuitry may further be configured to receive at least one handover acknowledgement from the target network entity. The circuitry may further be configured to transmit a handover command to the user equipment. The circuitry may further be configured to transmit packets for the user equipment to the target network entity.

In accordance with some embodiments, a method may include sending, by a control unit connected to both a source network unit and a target network unit, a handover request to the target network unit, the handover request indicating a request for a handover of a user equipment from the source network unit to the target network unit. The method may further include receiving, by the control unit from the target network unit, an acknowledgement to the handover request. The method may further include, in response to the acknowledgment, switching, by the control unit, a path for at least one radio bearer of the user equipment from the source network unit to the target network unit or duplicating, by the control unit, at least one downlink packet for the user equipment to both the source network unit and the target network unit.

In accordance with certain embodiments, an apparatus may include means for sending a handover request to a target network unit, the handover request indicating a request for a handover of a user equipment from a source network unit to the target network unit. The apparatus may further include means for receiving an acknowledgement to the handover request. The apparatus may further include means for in response to the acknowledgment, switching a path for at least one radio bearer of the user equipment from the source network unit to the target network unit or duplicating at least one downlink packet for the user equipment to both the source network unit and the target network unit.

In accordance with various embodiments, an apparatus may include at least one processor and at least one memory including computer program code. The at least one memory and the computer program code may be configured to, with the at least one processor, cause the apparatus to at least send a handover request to a target network unit, the handover request indicating a request for a handover of a user equipment from a source network unit to the target network unit. The at least one memory and the computer program code may be further configured to, with the at least one processor, cause the apparatus to at least receive an acknowledgement to the handover request. The at least one memory and the computer program code may be further configured to, with the at least one processor, cause the apparatus to at least, in response to the acknowledgment, switch a path for at least one radio bearer of the user equipment from the source network unit to the target network unit or duplicate at least one downlink packet for the user equipment to both the source network unit and the target network unit.

In accordance with some embodiments, a non-transitory computer readable medium may be encoded with instructions that may, when executed in hardware, cause an apparatus to perform a method. The method may include sending a handover request to a target network unit, the handover request indicating a request for a handover of a user equipment from a source network unit to the target network unit. The method may further include receiving an acknowledgement to the handover request. The method may further include, in response to the acknowledgment, switching a path for at least one radio bearer of the user equipment from the source network unit to the target network unit or duplicating at least one downlink packet for the user equipment to both the source network unit and the target network unit.

In accordance with certain embodiments, a computer program product may cause an apparatus to perform a method. The method may include sending a handover request to a target network unit, the handover request indicating a request for a handover of a user equipment from a source network unit to the target network unit. The method may further include receiving an acknowledgement to the handover request. The method may further include, in response to the acknowledgment, switching a path for at least one radio bearer of the user equipment from the source network unit to the target network unit or duplicating at least one downlink packet for the user equipment to both the source network unit and the target network unit.

In accordance with various embodiments, an apparatus may include circuitry configured to send a handover request to a target network unit, the handover request indicating a request for a handover of a user equipment from the source network unit to the target network unit. The circuitry may further be configured to receive an acknowledgement to the handover request. The circuitry may further be configured to, in response to the acknowledgment, switch a path for at least one radio bearer of the user equipment from the source network unit to the target network unit or duplicate at least one downlink packet for the user equipment to both the source network unit and the target network unit.

BRIEF DESCRIPTION OF THE DRAWINGS:

For proper understanding of example embodiments, reference should be made to the accompanying drawings, wherein.

DETAILED DESCRIPTION:

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for coordinating immediate delivery of downlink data packets as they arrive is not intended to limit the scope of certain embodiments, but is instead representative of selected example embodiments.

For mobility and handover procedures in cyber-physical control applications, such as industrial internet of things (IIoT) services, end devices frequently communicate via a cellular communication system, such as 5G NR. Such communication services supporting these cyber-physical control applications should be ultra-reliable and dependable by providing high communication service availability, as well as low or very low end-to-end latency.

Activity patterns of these control systems may be open-loop, wherein there is no feedback from an output to a controller, or closed-loop, where actuators feed the output back to the controller. The communication service can also be periodic, where the transmission is repeated at fixed intervals (which may be referred to as "transfer intervals"), or aperiodic.

Figure 1:
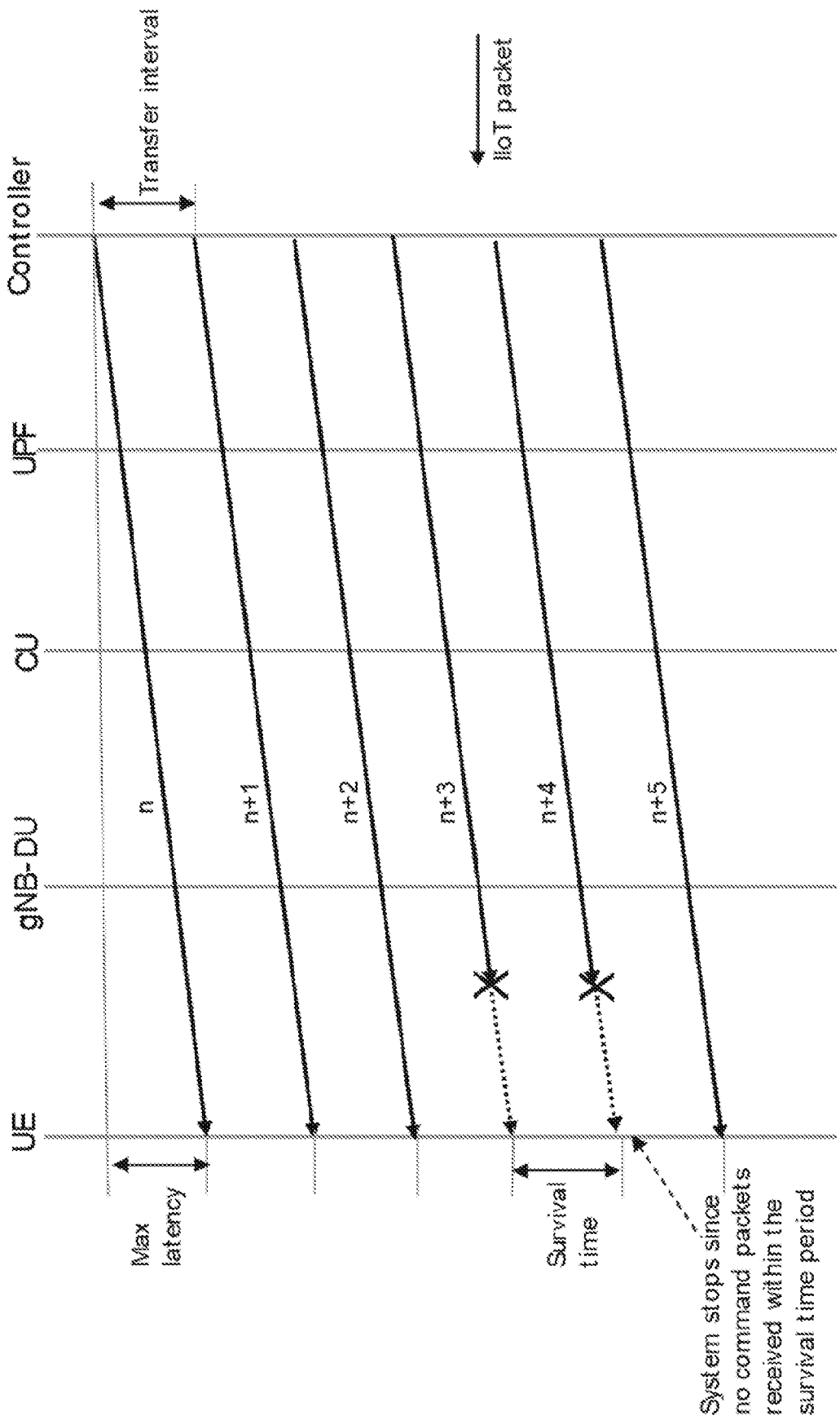
FIG. 1 illustrates an example of packet data traffic in deterministic periodic communication for an internet of things service.

Deterministic cyber-physical services include stringent requirements on maximum latency, ranging from less than 1 millisecond (ms) up to 100 ms, depending on the application. Any message delayed beyond the maximum latency period would be considered lost. In addition, communication service availability requirements is based upon latency, survival time, and reliability. In particular, survival time describes the time that an application which is consuming a communication service may continue without receiving an anticipated message. The system would be considered unavailable when no messages are received by the application's survival time expiration. FIG. 1 shows an example of a deterministic periodic communication between a controller and a cyber-physical user equipment (UE) over a 5G wireless network. In this example, the maximum tolerable delay of a packet is "Max. latency," while the survival time is equal to one unit of the transfer interval. Despite losing the message n+3, the UE could continue operating but the survival time counter begins counting. Since the message n+4 is also lost, the UE didn't receive any message within the survival time; it ceased operating at the expiration of the survival time counter.

In inter-cell handover procedures in 5G NR, an interruption period exists during which no packet transfer is possible between the UE and network, delaying packet deliveries until the completion of the handover. This interruption time could be several tens of milliseconds or more. The interruption could begin when the source cell transmits a RRCReconfiguration message containing a handover command to the UE after it has determined a target cell to handover the UE. Upon receiving the handover command, the UE would begin synchronization with the target network entity (NE) by performing random access channel (RACH) procedure with the target cell. The interruption ends when the UE successfully completes the RAP by sending a RRCReconfigurationComplete message to the target NE. During this interruption, all downlink, user-plane packets are buffered at the target NE, and the UE pauses transmitting any further uplink user-plane data.

Conditional handover (CHO) has been proposed as one technique for improving robustness against radio link failure (RLF) during handover. In CHO, the handover command contains a condition to be evaluated by the UE to execute the handover. Downlink packets continue to be forwarded to the source cell, including after the handover command is issued. When the CHO condition is satisfied, the UE ceases communicating with the source cell, and begins a RAP with the target cell. Upon completion of the handover, the target cell notifies the source cell to discontinue transmission to the UE, and instead forward downlink packets to the target cell. The handover interruption period begins after the CHO condition is satisfied, at which point, the UE stops downlink and uplink data transfer with the source cell, and begins its synchronization procedure with the target cell. The interruption period ends when the UE sends a RRCReconfigurationComplete message to the target cell.

Inter-cell mobility and handover may be required in service areas, e.g., for IIoT use cases, and to minimize handover latencies, a centralized 5G NR architecture may be used, such that each cell is served by a NE, such as a next generation node B distributed unit (gNB-DU), where multiple gNB-DUs are connected to a centralized unit (CU) via an F1 interface. Some embodiments of the present application may be applied to such network architecture, as well as other network architectures.

In some handover procedures for a centralized deployment architecture, downlink packets arriving after the handover command is issued may be buffered at the CU for delivery via a target gNB-DU after the UE completes the handover. The handover interruption time may be calculated as Handover interruption time=$D_{handover}+T_{interrupt}+T_{RACH}$, where $D_{handover}$ is the RRC procedure delay for processing RRCReconfiguration messages containing the handover command, $T_{interrupt}$ is the time from the end of processing the RRCReconfiguration message to the UE starting the transmission of random access preamble, and $T_{RACH}$ is the time interval from the RACH preamble transmission to the successful sending of the RRCReconfigurationComplete message.

Figure 2:
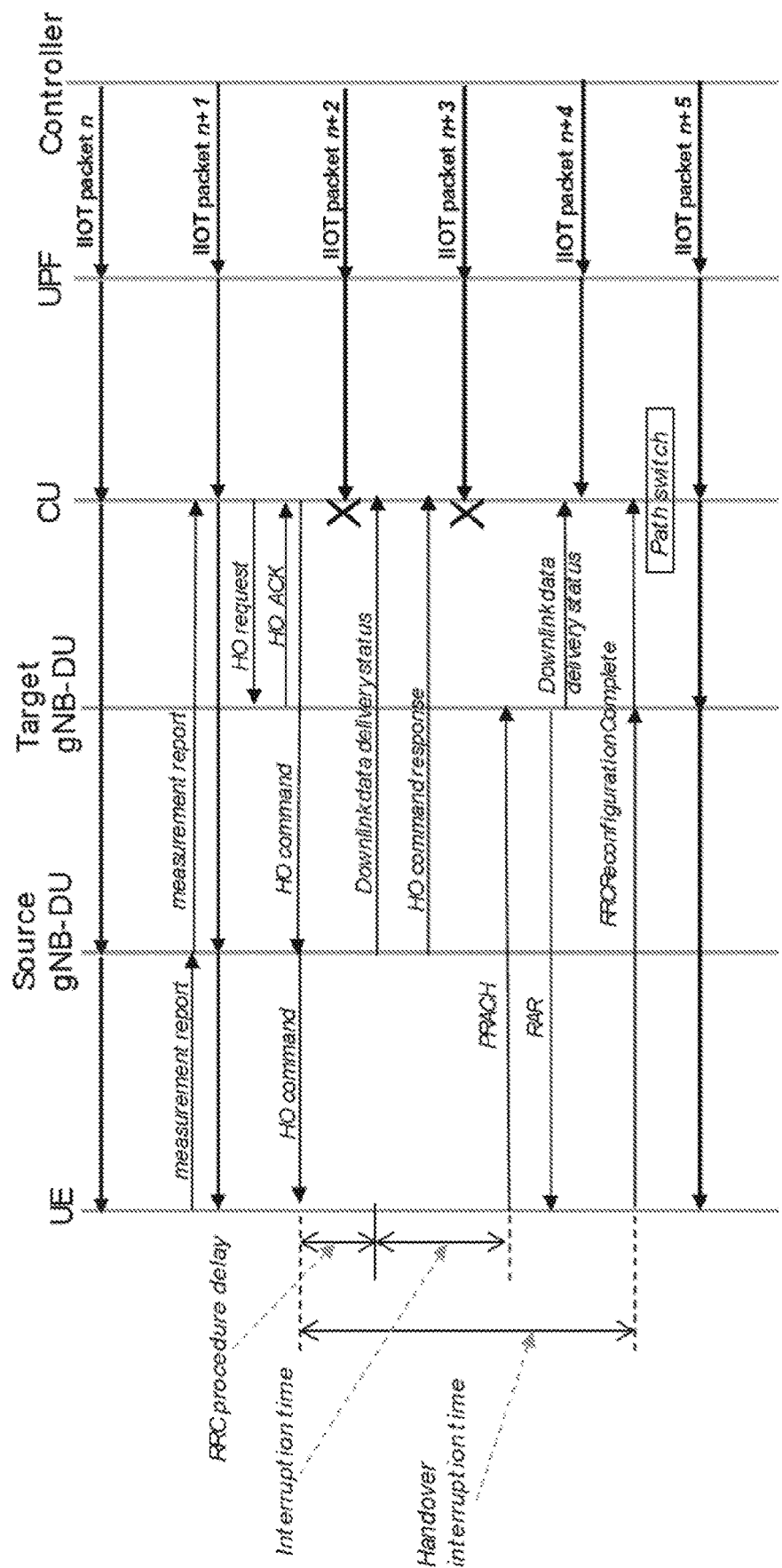
FIG. 2 illustrates an example of various impacts of handover interruption time on internet of things services using baseline handover procedures.

All downlink IIoT packets arriving during the handover interruption time may be delayed, and would be considered lost if the delay exceeds the maximum latency period for the service. If the UE is unable to receive packets within the survival time period, the service is unacceptable. For example, as illustrated in FIG. 2, packets n and n+1 were delivered to the UE before the handover execution began. Packets n+2, n+3, and n+4 arrived at the CU during the handover interruption time. Packets n+2 and n+3 are considered lost since their delay will exceed the maximum latency, while packet n+4 may be delivered after the handover execution is completed within the maximum latency limit. However, the loss of the two consecutive packets n+2 and n+3 will result in expiration of the survival time.

Figure 3:
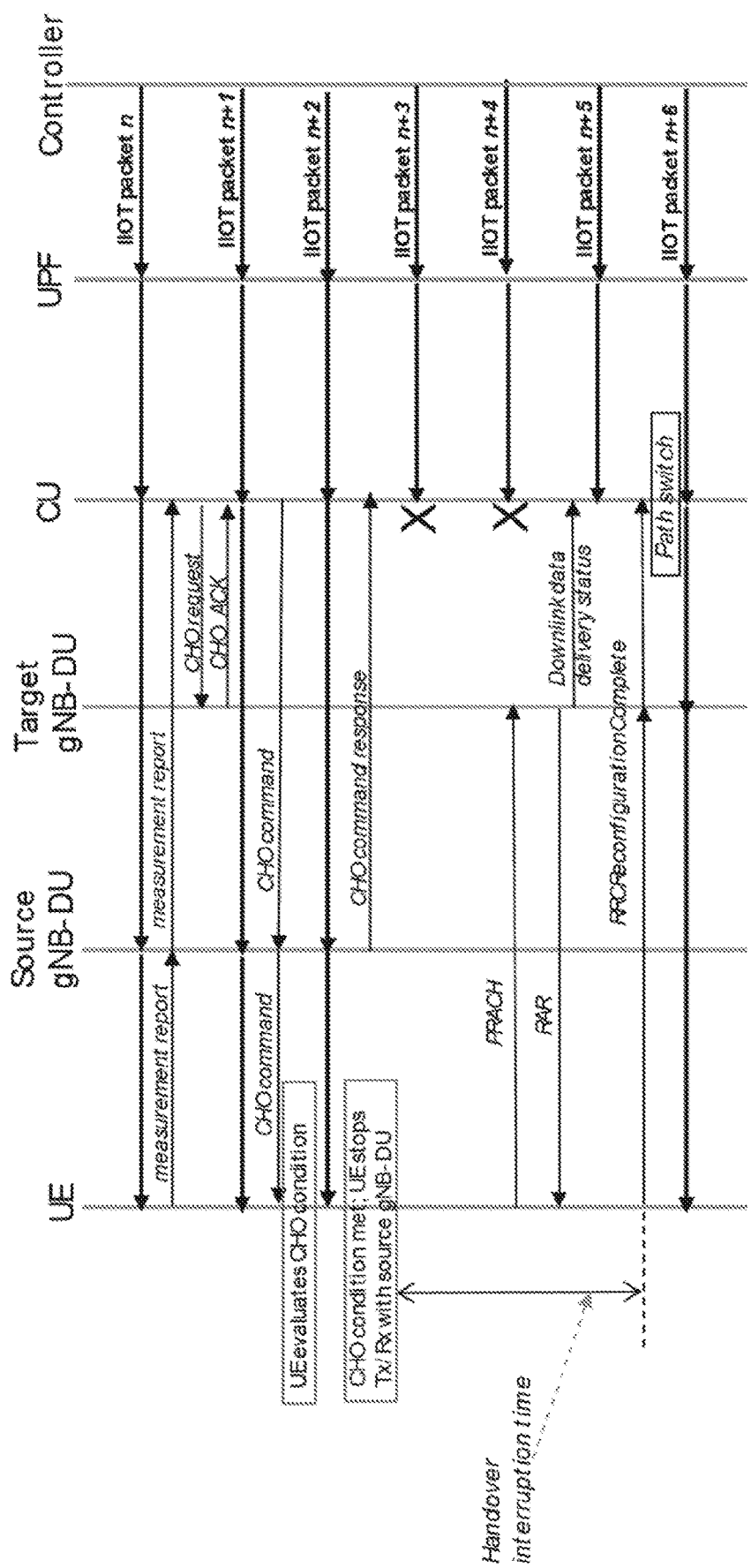
FIG. 3 illustrates an example of various impacts of handover interruption time on internet of things services using conditional handover procedures.

Similarly, FIG. 3 depicts the impact of handover interruptions on downlink IIoT packets for CHO. IIoT packet n+2 is delivered to the UE via source gNB-DU since the UE is still attached to source gNB-DU after receiving the CHO command. However, packets n+3 and n+4 cannot be delivered within the delay constraint and are considered lost. Finally, packet n+5 may be delivered via the target gNB-DU after the handover is completed. Thus, it is desirable to provide a mechanism such that prevents or reduces delays of packet deliveries during the handover execution procedure.

Certain embodiments described herein may have various benefits and/or advantages. Some embodiments may apply to downlink transmissions where the controller is connected to the network side, and mobile actuators are wirelessly connected to the network (e.g., a 5G network) and subject to inter-cell handover. Some embodiments may be applied to various communication scenarios, including a scenario with clock synchronization services in a time sensitive network (TSN), where the TSN master clock resides in the network, as well as mobile robots communicating via a 5G link with a controller in the network. Some embodiments described herein may eliminate downlink packet losses in IIoT services during handover. This may be useful for IIoT services where the controller is in the network, such as mobile robots, time synchronization services in TSN network where the TSN master clock is in the network. Additionally, various embodiments may be implemented in UEs with a single transceiver, reducing the cost of the UE device.

In addition, in some embodiments, good radio link conditions of the target cell may be utilized as early as possible for timely delivery of downlink packets (e.g., IIoT packets) during handover of a radio link of the UE. Packet dropping during handover may be avoided or reduced, which may help to maintain the reliability of the radio link and/or improve availability of the service of the UE. Furthermore, in some embodiments, during handover, packets may be delivered to the UE via the target cell to which the UE has a stronger link. In this way, the probability of success of the packet delivery is higher compared to techniques where packet is delivered via the source cell during the handover, since during handover, the link of UE to the source cell may be degrading, whereas its link to the selected target cell is stronger. Thus, certain embodiments discussed below are directed to improvements in computer-related technology.

In several embodiments discussed herein, during the HO command processing, the UE may be unable to receive any packet from the network because the UE radio link condition with the source cell may be unpredictable after the HO command is issued and/or the UE may not be able to receive or transmit during the HO command processing. Thus, the delay budget for a packet in RAN may need to include the RRC procedure delay. This parameter may be communicated to the network, e.g., during UE capability configuration in the network and/or the IIoT bearer configuration.

Various embodiments described herein may also be effective for handovers where both the source NE and the target NE include a CU and DU. In some embodiments, the source NE-DU and the target NE-DU may be connected to the same CU. In some other embodiments, the source NE-DU and the target NE-DU may be connected to different CUs, source gNB-CUs, and target gNB-CUs, respectively. The two main functional changes are in security configuration and path switch. In particular, while performing immediate downlink data transmission, the target NE-CU may use the security parameters it has received from the source NE-DU in the handover command. The UE may use the security configurations derived from the parameters received in the handover command for decryption of the downlink packets received from the target NE-CU. In addition, to reduce delays in the baseline handover, after the target NE configures immediate downlink data transmission for the IIoT radio bearers of the UE, the target NE-CU may perform the path switch with the AMF and UPF. For the conditional handover, the target NE-CU may transmit a message to the UPF to duplicate the future IIoT packets to both the source NE-CU and the target NE-CU.

Figure 4:
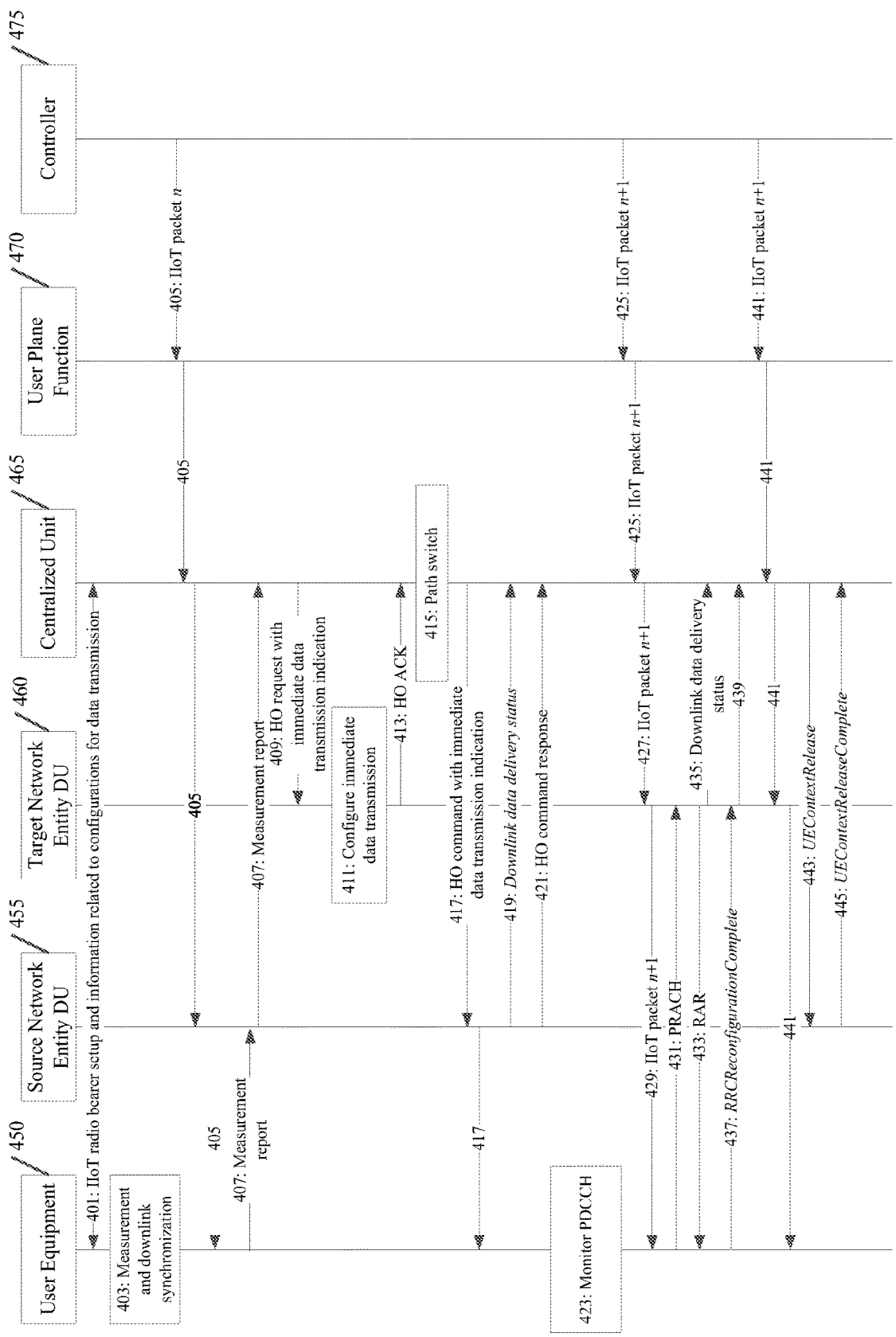
FIG. 4 illustrates an example of a signaling diagram according to certain embodiments.
Figure 14:
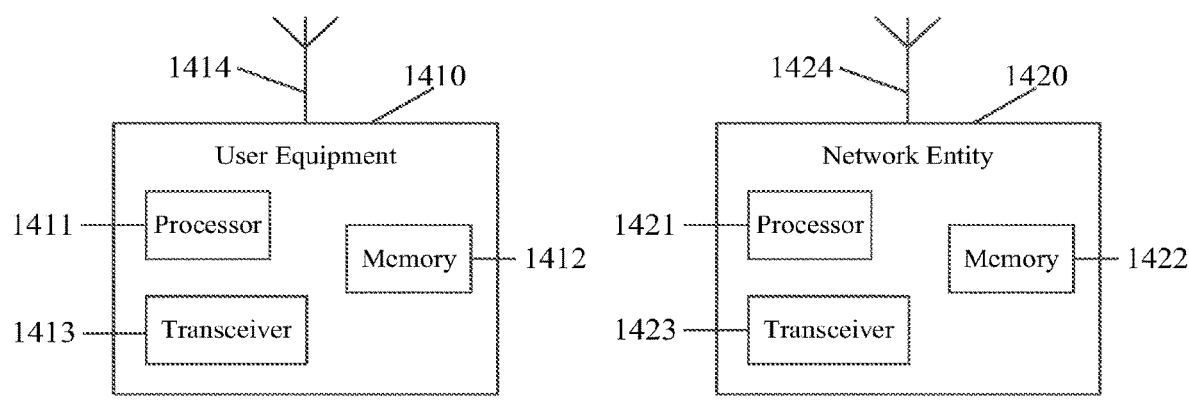
FIG. 14 illustrates an example of various network devices according to some embodiments.

FIG. 4 illustrates an example of a signaling diagram depicting how to coordinate delivery of downlink data packets during handover of UE. In some embodiments, the downlink data packets may be delivered as they arrive. UE 450 may be similar to UE 1410 illustrated in FIG. 14, while source NE-DU 455, target NE-DU 460, CU 465, UPF 470, and controller 475 may be similar to NE 1420 as illustrated in FIG. 14, according to certain embodiments. Although UE 450 may have IIoT-related traffic in this example, some embodiments of the present application are not limited thereto. Instead, similar embodiments may apply to handover of UE with other traffic/services. At 401, UE 450 and CU 465 may perform IIoT radio bearer setup, and information related to configurations for data transmission during handover may be exchanged during the setup. Bearers may be configured at both UE and CU with downlink data delivery during handover. Then at 403, UE 450 may perform measurements of neighboring cells (candidates for handovers) for handover preparation as configured by RRC, and during the measurement, UE 450 may acquire downlink synchronization with measured cells, which may include acquiring downlink frames, sub-frames, and/or symbol timings. In some embodiments, UE 450 may use gaps between successive IIoT packets to perform these measurements and acquire downlink synchronization.

At 405, controller 475 may transmit packets (e.g., IIoT packet n) to UE 450 via UPF 470, CU 465, and source NE-DU 455. At 407, UE 450 may transmit measurement reports to source NE-DU 455, which is then forwarded to CU 465. Based on the received measurement reports, CU 465 may select target NE-DU 460 to handover UE 450 at 409. As an example, CU 465 may transmit a handover request (i.e., HO request) to target NE-DU 460, ordering NE-DU 460 to create a UE context, and setup any number of data bearers. The requests may include additional indication for immediate downlink data delivery configuration setup for IIoT radio bearers. In some embodiments, the handover request to target NE-DU 460 may also include a measurement report received from UE 450. This may enable NE-DU 460 to determine proper transmission parameters for the immediate downlink data delivery to UE 450 during handover.

At 411, target NE-DU 460 may set up the UE context, and may configure immediate downlink data delivery for IIoT radio bearers associated with UE 450. At 413, target NE-DU 460 may transmit to CU 465 a handover acknowledgement (i.e., HO ACK) message, which may contain information required to access target NE-DU 460 by UE 450, and/or indications for CU 465 to configure immediate data delivery setup for target gNB-DU 460.

At 415, CU 465 may perform a path switch for the downlink IIoT radio bearers of UE 450, and may forward all future IIoT packets for UE 450 to target NE-DU 460. At 417, CU 465 may transmit RRCReconfiguration messages to source NE-DU 455, which may be further transmitted to UE 450. The RRCReconfiguration message may contain an HO command configured to cause UE 450 to configure immediate data delivery setup for target NE-DU 460. Source NE-DU 455 may then forward the received RRCReconfiguration message to UE 450. In some embodiments, at 419, source NE-DU 455 may transmit to CU 465 a Downlink Data Delivery Status message. In some embodiments, at 421, source NE-DU 455 may transmit to CU 465 a handover command response message.

At 423, UE 450 may process the received RRCReconfiguration messages and/or retrieve any of system information (SI), PDCCH and/or PDSCH configurations of target NE-DU 460, and a cell-radio network temporary identity (C-RNTI) allocated by target NE-DU 460. UE 450 may then begin monitoring target NE-DU 460. For example, UE 540 may monitor DL control channel (e.g., physical downlink control channel (PDCCH)) from the target NE-DU 460 for downlink allocations addressed to the C-RNTI. In this way, data delivery from target NE-DU 460 to UE 450 is enabled prior to completion of the handover procedure. In some embodiments, this immediate data delivery from the target cell to the UE can occur prior to random access procedure initiated by the UE 540 at 431 to achieve uplink synchronization. At 425, controller 475 may transmit to CU 465, via UPF 470, one or more downlink packets (e.g., IIoT packets), which may be forwarded by CU 465 to target NE-DU 460 at 427.

Target NE-DU 460 may then, at 429, transmit the IIoT packet(s) to UE 450, e.g., over a physical downlink shared channel (PDSCH). In order to improve the success probability of the transmission, target NE-DU 460 may use a very robust transmission scheme (i.e., modulation and coding scheme). For example, target NE-DU 460 may use the best beam reported by UE 450 in its measurement report and forwarded by CU 465 in the handover preparation message. Additionally or alternatively, target NE-DU 460 may also transmit the packet over multiple beams, as reported by UE 450 in its measurement reports. In order to improve the probability of success, target NE-DU 460 may perform additional hybrid automatic repeat request (HARQ) retransmissions of the packet, e.g., prior to receiving HARQ feedback from the UE 450. Target NE-DU 460 may continue retransmission of the packet until any of: the delivery deadline expires; an estimated max number of required retransmissions for successful delivery is completed; target NE-DU 460 receives HARQ ACK for the transmission (after UE 450 has completed its RACH procedure); and UE 450 transmits RLC status reports indicating successful transmission after the RRCReconfigurationComplete message has been sent at 437.

In some embodiments, at the PHY layer, UE 450 may use the downlink transmission configurations (e.g., PDCCH and PDSCH configurations) of target NE-DU 460 indicated in the system information (SI) of target NE-DU 460 received in the HO command message. In some embodiments, if closed-loop HARQ is configured for the transmission of the downlink IIoT packet from target NE-DU 460, UE 450 may suppress its HARQ feedback until it has completed uplink synchronization.

As shown in FIG. 4, UE 450 may initiate random access procedures by sending physical random access channel (PRACH) preambles to target NE-DU 460 at 431, and receive random access response (RAR) messages from target NE-DU 460 at 433. RAR messages may include timing advance configurations for UE 450 to achieve uplink synchronization with target NE-DU 460. In some embodiments, target NE-DU 460 may report downlink data delivery status to CU 465 at 435.

At 437, UE 450 may transmit RRCReconfigurationComplete messages to target NE-DU 460, which may indicate completion of the handover procedure. Target NE-DU 460 may then forward it to CU 465 at 439.

In various embodiments, target NE-DU 460 may initialize the RLC entity for the IIoT radio bearer during handover preparation, and UE 450 may initialize the corresponding RLC entity after the HO command is processed. If radio link control acknowledgement mode (RLC AM) is used, UE 450 does not send any RLC status update until it has sent RRCReconfigurationComplete messages. After the handover is completed, UE 450 may send a cumulative ACK for all the downlink packets UE 450 has received during the HO. At 441, UE 450 may begin normal operation for user plane data delivery with target NE-DU 460. At 443, CU 465 may indicate to source NE-DU 455 to release UE context. Source NE-DU 455 may then release the UE context, and may send a release complete message to CU 465 at 445.

Figure 5:
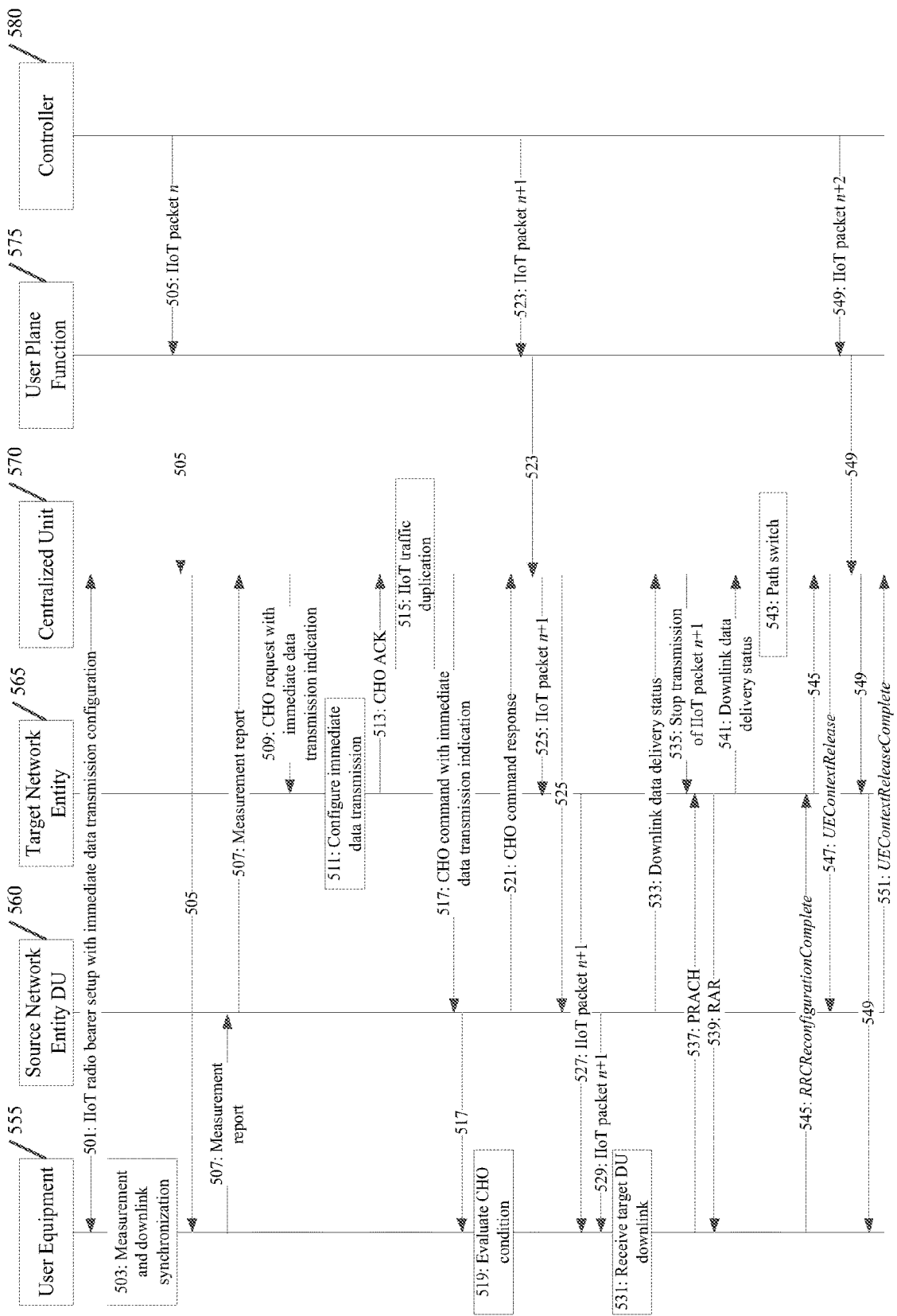
FIG. 5 illustrates another example of a signaling diagram according to some embodiments.

FIG. 5 illustrates another example of a signaling diagram depicting how to coordinate delivery of downlink data packets (e.g., as they arrive) during handover of a UE, with steps and entities similar to those illustrated in FIG. 4. However, FIG. 5 illustrates an application with conditional handover. For example, while 501-507 and 511 may be similar to 401-407 and 411, at 509, the handover request from CU 570 to target NE-DU 565, as well as the CHO command at 517, may be for conditional handover. Here, upon receiving at 513 the CHO ACK from target NE-DU 565, CU 570 may begin at 515 duplication of future packets for UE 555 (e.g., IIoT packets) by sending packets to both source NE-DU 560 and target NE-DU 565.

During the handover execution, both source NE-DU 560 and target NE-DU 565 may attempt to deliver the downlink IIoT packet to UE 555. Source NE-DU 560 may transmit the packets using the existing configurations, while target NE-DU 565 may use the configurations as described above with reference to FIG. 4. At 519, UE 555 may evaluate CHO conditions, and at 521, source NE-DU 560 may transmit to CU 570 at 521 a CHO command response. At 523, controller 580 may transmit packets (e.g., IIoT packet n +1) to UE 555, via UPF 575, CU 570, target NE-DU 565, and source NE-DU 560. CU 570 may send the downlink packets to both source NE-DU 560 and target NE-DU 565 at 525.

Target NE-DU 565 may then transmit the downlink packets to UE 555 at 527, and source NE-DU 560 may transmit the downlink packets to UE 555 at 529. UE 555 may then, at 531, receive target DU downlink packets when CHO condition has been met.

Furthermore, if a downlink packet arrives before the CHO condition has been met, UE 555 may receive the packet from source NE-DU 560. When CU 570 receives the downlink data delivery status (DDDS) packet at 533 from source NE-CU 560 indicating successful delivery of the packet, CU 570 may send a message to target NE-DU 565 to stop transmission of the packet at 535. After CHO condition is met, UE receives following packet(s) from target NE-DU 565.

As shown in FIG. 5, UE 555 may initiate random access procedures by sending physical random access channel (PRACH) preambles to target NE-DU 565 at 537, and receive random access response (RAR) messages from target NE-DU 565 at 539. RAR messages may include timing advance configurations for UE 555 to achieve uplink synchronization with target NE-DU 565. In some embodiments, target NE-DU 565 may report downlink data delivery status to CU 570 at 541.

At 543, CU 570 may perform a path switch for the downlink IIoT radio bearers of UE 555. At 545, UE 555 may transmit RRCReconfigurationComplete messages to target NE-DU 565, which may indicate completion of the handover procedure, followed by target NE-DU 565 forwarding it to CU 570. At 547, CU 570 may transmit a UEContextRelease message to source NE-DU 560.

At 549, controller 580 may transmit packets (e.g., IIoT packet n +2) to UE 555, via UPF 575, CU 570 and target NE-DU 565. Source NE-DU 560 may release the UE context by sending a release complete message to CU 570 at 551.

Figure 6:
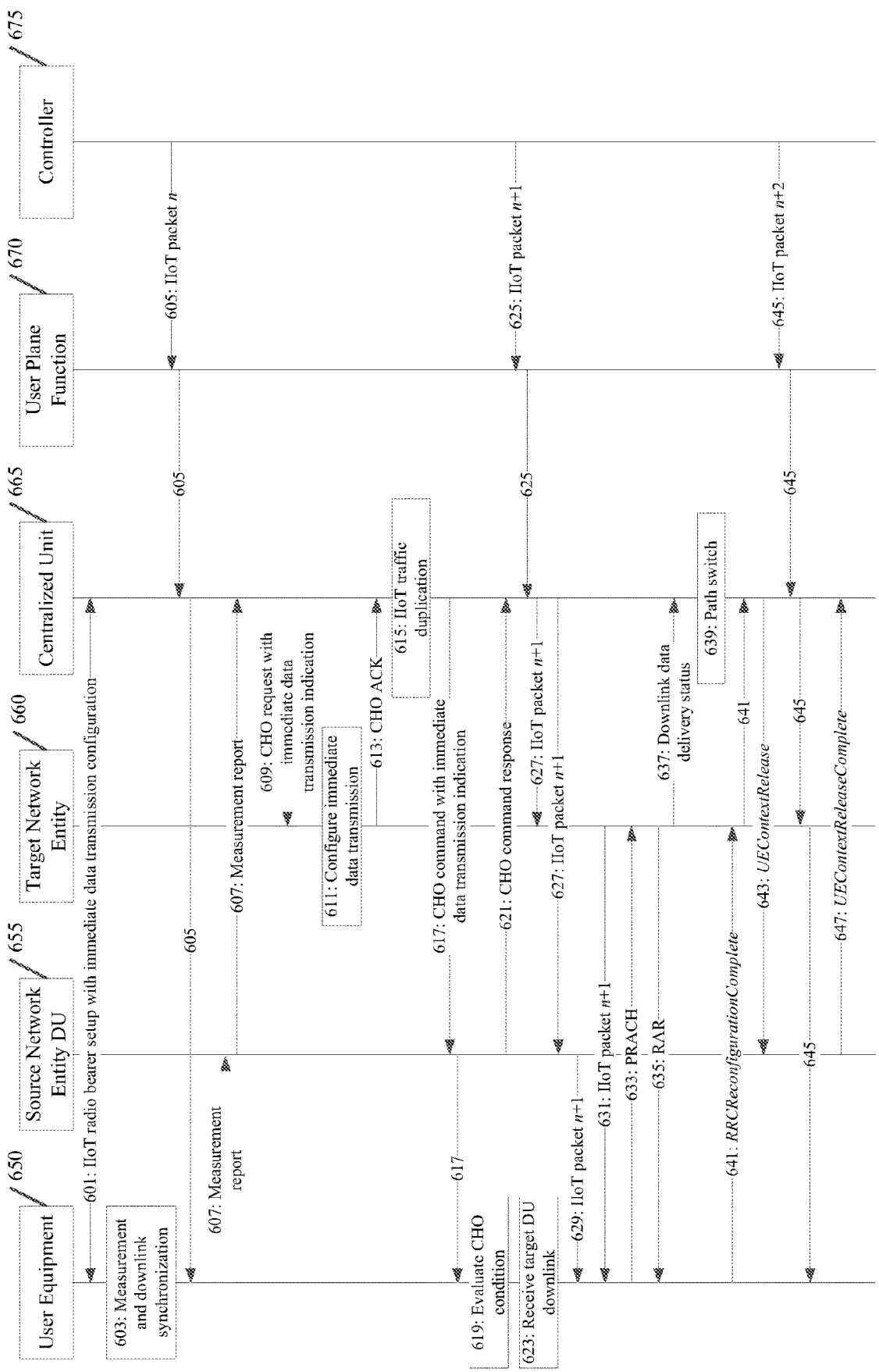
FIG. 6 illustrates another example of a signaling diagram according to various embodiments.

FIG. 6 illustrates another example of a signaling diagram depicting how to coordinate delivery of downlink data packets (e.g., as they arrive) during handover of a UE, with steps and entities similar to those illustrated in FIGS. 4 and 5. For example, 601-621 may be similar to 501-521. In this example, the difference from FIG. 5 is that a downlink IIoT packet may arrive after the CHO condition has met, and UE 650 may receive, at 623, the packet from target NE-DU 660 in a way similar to that described with reference to FIG. 4. 625-631 may then be similar to 523-529. 633-635 may be similar to 537-539, and 637 may be similar to 541. At 639, CU 665 may perform a path switch for the downlink IIoT radio bearers of UE 650. Finally, 641-647 may also be similar to 545-551.

In various embodiments, when source NE-DU 655 receives, at 643, the UE context release message from CU 665 after the handover is completed, source NE-DU 655 may stop transmission of the packet in case the delivery deadline has not expired yet.

In some embodiments, CU 665 may stop duplication of the IIoT packet after UE 650 completes its random access procedure, and CU 665 receives the DDDS message from target NE-DU 660. From then on, CU 665 may then send the downlink packets only to target NE-DU 660.

Figure 7:
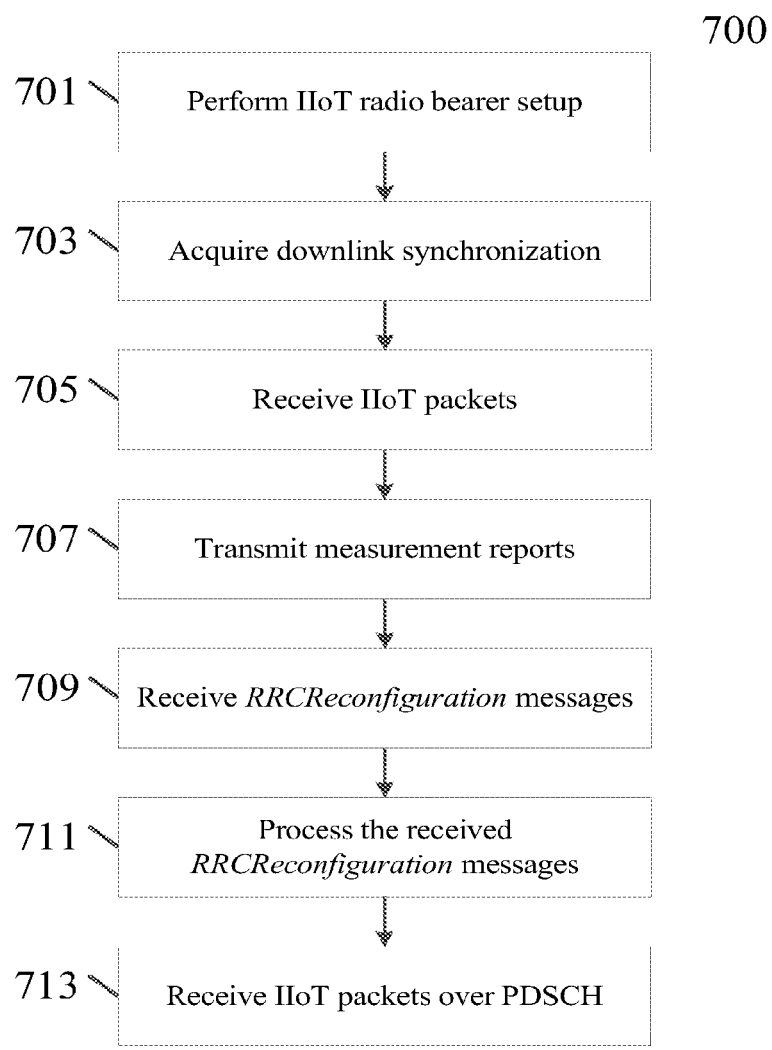
FIG. 7 illustrates an example of a flow diagram of a method according to certain embodiments.

FIG. 7 illustrates an example of a flow diagram of a method 700 that may be performed by a UE, such as UE 1410 illustrated in FIG. 14, according to various embodiments. Though the UE may have IIoT-related traffic in this example, it should be appreciated that some embodiments are not limited thereto. Instead, similar solutions may also apply to handover of the UE with other traffic/services. At 701, the UE and a centralized unit, similar to CU 570 in FIG. 5, may perform IIoT radio bearer setup, and information related to one or more configurations for data transmission during handover may be exchanged during the setup. For example, the UE may send a request for interruption free handover to the centralized unit. Bearers for downlink data delivery during handover may be configured at both the UE and the centralized unit. At 703, the UE may perform measurements of neighboring cells (candidates for handovers) for handover preparation as configured, e.g., by radio resource control (RRC) signaling During the measurement, the UE may acquire downlink synchronization with measured cells, which may include acquiring downlink frames, sub-frames, and/or symbol timings. In some embodiments, the UE may use gaps between successive IIoT packets to perform these measurements and acquire downlink synchronization.

At 705, the UE may receive packets (i.e., IIoT packets) from a controller, which may be similar to controller 580 in FIG. 5, via a UPF, the CU, and a source NE-DU, which may also be similar to NE 1420 in FIG. 14. At 707, the UE may transmit measurement reports to the source NE-DU, which may be forwarded to the CU, according to its measurement reporting configuration.

At 709, the UE may receive a RRC reconfiguration message from the source NE-DU. The RRC reconfiguration message may contain an HO command indicating a handover of the UE to a target NE-DU. In some embodiments, the HO command may cause the UE to configure immediate data delivery setup for the target NE-DU to enable data delivery from the target NE-DU to the UE during the handover procedure.

At 711, the UE may process the received RRC reconfiguration messages and/or retrieve any of system information (SI), PDCCH and/or PDSCH configurations of the target NE-DU, and the C-RNTI allocated by the target NE-DU.

The UE may then begin monitoring dedicated downlink transmission(s) for the UE from the target NE-DU. For example, the UE may monitor DL control channel (e.g., PDCCH) from the target NE-DU for downlink allocations addressed to the C-RNTI prior to transmitting any uplink signal (e.g., PRACH preamble) to the target NE-DU. In this way, data delivery from the target cell to the UE may be enabled prior to completion of the handover procedure. In some embodiments, this immediate data delivery from the target cell to the UE may occur prior to random access procedures initiated by the UE to achieve uplink synchronization.

At 713, the UE may receive packets (e.g., IIoT packets) from the target NE-DU. The packets may be received over PDSCH.

In some embodiments, at the physical (PHY) layer, the UE may use the downlink transmission configurations (e.g., PDCCH and PDSCH configurations) of the target cell indicated in the SI of the target NE-DU received in the HO command message. In some embodiments, the UE may alternatively obtain the SI of the target NE-DU directly by monitoring broadcasting from the target NE-DU. In some embodiments, if closed-loop HARQ is configured for the transmission of the downlink packet from the target NE-DU, the UE may suppress its HARQ feedback until it has completed uplink synchronization. That is, the UE may transmit, to the target NE-DU, at least one HARQ feedback for DL packets received during HO procedure from the target NE-DU, after completion of the uplink synchronization, and/or completion of the HO procedure. Alternatively of additionally, in some embodiments, the UE may transmit, to the target NE-DU, at least one automatic repeat request (ARQ) feedback for DL packets received during HO procedure from the target NE-DU, after completion of the uplink synchronization, and/or completion of the HO procedure.

In various embodiments, the UE may initiate a RACH procedure by sending a PRACH preamble to the target NE-DU, and receive a RAR message from the target NE-DU. The RAR message may include a timing advance configuration for the UE to achieve uplink synchronization with the target cell. Additionally or alternatively, the UE may transmit a message (e.g., RRCConfigurationComplete message) to the target NE-DU to indicate completion of the handover procedure.

In various embodiments, the target NE-DU may initialize the RLC entity for the IIoT radio bearer during handover preparation, and the UE 450 may initialize the corresponding RLC entity after the HO command is processed. If RLC AM mode is used, the UE may not send any RLC status update until it has sent RRCReconfigurationComplete messages. After the handover is completed, the UE may send a cumulative feedback (e.g., HARQ or ARQ feedback) for all the downlink packets the UE has received during the HO. The UE may then begin normal operation for user plane data delivery with the target cell.

Figure 8:
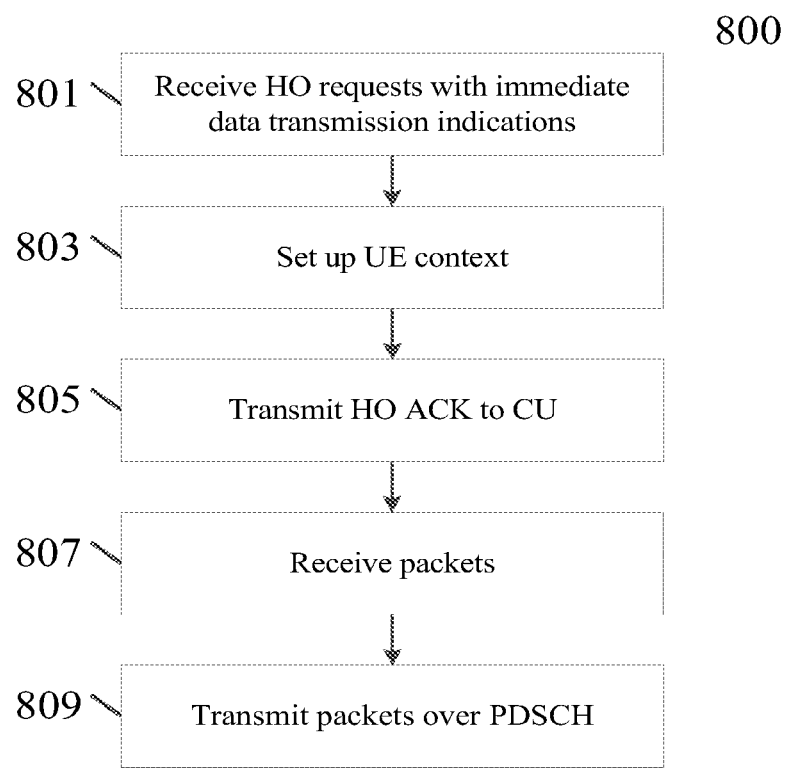
FIG. 8 illustrates another example of a flow diagram of a method according to some embodiments.

FIG. 8 illustrates an example of a flow diagram of a method 800 that may be performed by a target NE or a target NE-DU, such as NE 1420 illustrated in FIG. 14, according to various embodiments. At 801, the target NE-DU may receive HO requests for a UE, with an indication for data transmission from the target NE-DU to the UE during a handover procedure. The measurement reports may be part of reports received by the target NE-DU to aid selection of transmission schemes. As an example, the target NE-DU may receive handover requests (i.e., HO request) configured to create a UE context, and setup any number of data bearers. The requests may include additional indication for immediate downlink data delivery configuration setup for IIoT radio bearers. Handover requests may also include the measurement reports.

At 803, the target NE-DU may set up the UE context, and may configure radio bearers associated with the UE for downlink data delivery during handover. At 805, the target NE-DU may transmit to a CU a handover acknowledgement (i.e., HO ACK) message, which may contain information required to access the target NE-DU by a UE, and/or indications for the CU to configure immediate data delivery setup for the target NE-DU, and at 807, the target NE-DU may receive packets (i.e., IIoT packets) for the UE. At 809, the target NE-DU may then transmit packets (i.e., IIoT packets) to the UE during handover procedure of the UE, e.g., over PDSCH, prior to receiving any uplink signal (e.g., PRACH preamble) from the UE. Since the data transmission starts prior to the completion of handover, it is also referred to as immediate data transmission or immediate data delivery herein. In order to improve the success probability of the transmission, the target NE-DU may use a very robust transmission scheme which may include, but is not limited to, a modulation and coding scheme, a beamforming scheme, etc. For example, the target NE-DU may use the best beam reported by the UE in its measurement report and forwarded by the CU in a handover request message. Additionally or alternatively, the target NE-DU may also transmit the packet over multiple beams, based on UE's measurement reports.

In order to improve the probability of success, the target NE-DU may perform additional HARQ retransmissions of the packet. The target NE-DU may continue retransmission of the packet until any of: the delivery deadline expires; an estimated max number of required retransmissions for successful delivery is completed; the target NE-DU receives HARQ ACK for the transmission (after the UE has completed its RACH procedure); and the UE transmits RLC status reports indicating successful transmission after the RRCReconfigurationComplete message has been sent. In various embodiments, the target NE-DU may initialize the RLC entity for the IIoT radio bearer during handover preparation.

Figure 9:
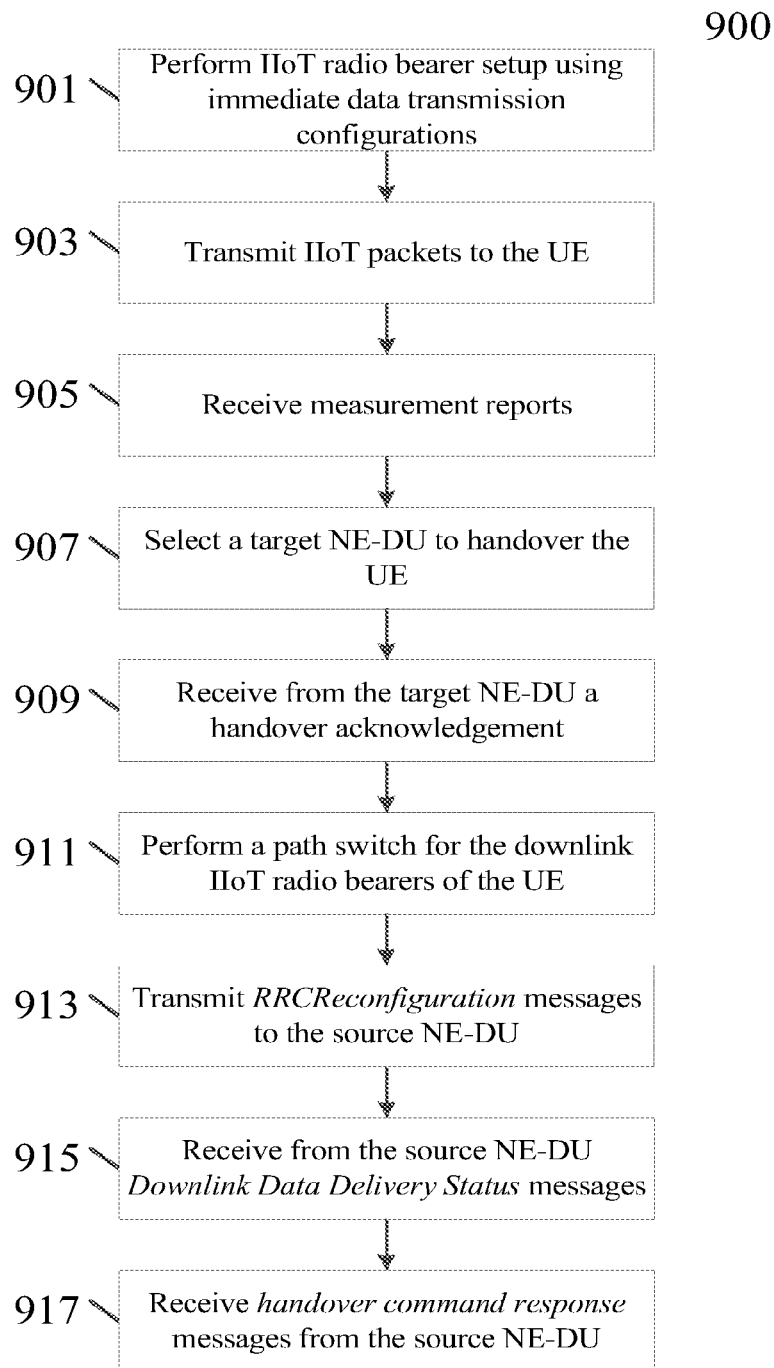
FIG. 9 illustrates another example of a flow diagram of a method according to various embodiments.

FIG. 9 illustrates an example of a flow diagram of a method 900 that may be performed by a CU, such as NE 1420 illustrated in FIG. 14, according to various embodiments. At 901, the CU may perform IIoT radio bearer setup for a UE using immediate data transmission configurations. Bearers may be configured at both UE and CU with immediate downlink data delivery during handover.

At 903, the CU may transmit IIoT packets to the UE via a UPF and source NE-DU. At 905, the CU may receive a UE measurement reports via the source NE-DU. Based on the received measurement reports, the CU may select a target NE-DU to handover the UE at 907. As an example, the CU may transmit a handover request (i.e., HO request) to the target NE-DU, to indicate the target NE-DU to create a UE context, and setup one or more data bearers. The request may include additional indication for immediate downlink data delivery configuration setup for radio bearers. The handover request may also include the measurement reports received from the UE.

At 909, the CU may receive from the target NE-DU a handover acknowledgement (i.e., HO ACK) message, which may contain information required to access the NE-DU by the UE, and/or indications for the CU to configure immediate data delivery setup for the target gNB-DU.

At 911, the CU may perform a path switch for the downlink radio bearers of the UE, and may forward all future IIoT packets for the UE to the target NE-DU. At 913, the CU may transmit a RRC Reconfiguration messages to the source NE-DU to be delivered to the UE; the RRC reconfiguration message may contain a HO command which indicates to the UE to configure immediate data delivery setup for the target gNB-DU. At 915, the CU may receive from the source NE-DU a downlink data delivery status messages, and then at 917, receive a handover command response messages from the source NE-DU.

Figure 10:
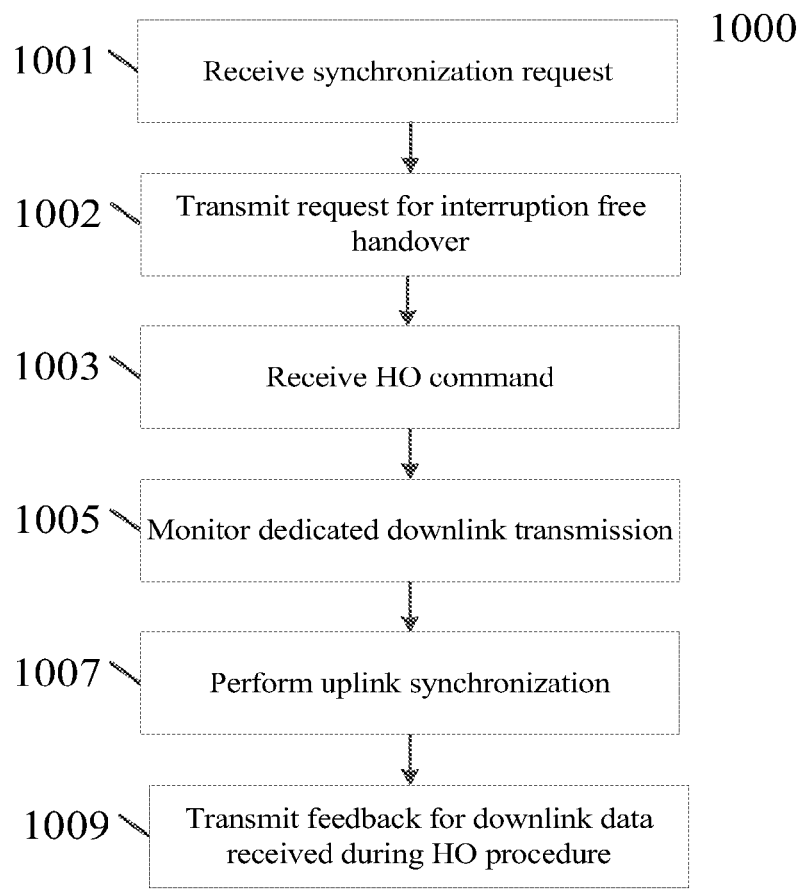
FIG. 10 illustrates another example of a flow diagram of a method according to various embodiments.

FIG. 10 illustrates an example of a flow diagram of a method 1000 that may be performed by a UE, such as UE 1410 illustrated in FIG. 14, according to various embodiments. Though the UE may have IIoT-related traffic in this example, it should be appreciated that some embodiments are not limited thereto. Instead, similar solutions may also apply to handover of the UE with other traffic/services.

At 1003, the user equipment may receive a handover command from a source network entity. At 1005, based on the received handover command, the user equipment may monitor at least one dedicated downlink transmission from a target network entity prior to transmitting any uplink signal to the target network entity. In some embodiments, the user equipment may start monitoring a downlink transmission dedicated for the user equipment from the target network entity during a handover procedure to the target network entity. In some embodiments, the user equipment may start monitoring a downlink transmission dedicated for the user equipment from the target network entity prior to performing uplink synchronization with the target network entity at 1007, e.g., prior to transmitting a PRACH preamble to initiate uplink synchronization with the target network entity. In some embodiments, the user equipment may start monitoring a downlink transmission dedicated for the user equipment from the target network entity prior to transmitting an uplink signal to indicate completion of the handover to the target network entity. In some embodiments, the user equipment may start monitoring a downlink transmission dedicated for the user equipment from the target network entity prior to transmitting an uplink signal based on a configuration of the target cell.

In some embodiments, the UE may determine implicitly that it should monitor DL data from the target network entity during the handover procedure (e.g., prior to uplink synchronization, and prior to transmitting any uplink signal to the target NE) based on its traffic type. For example, if its current traffic requires interruption free handover, it may perform such monitoring during handover. Alternatively, in some embodiments, the method may further comprise, at 1002, the UE transmitting at least one request for an interruption free handover to the source network entity. In some embodiments, the at least one request may be transmitted during a setup procedure of at least one radio bearer with the source network entity. The radio bearer may be for IIOT traffic in some embodiments.

Alternatively or additionally, in some embodiments, at 1001, the user equipment may receive a synchronization request from the source network entity prior to receiving the handover command. The synchronization request may request the user equipment to acquire downlink synchronization information of at least one neighboring network entity including the target network entity, which may enable the user equipment to start monitoring downlink data transmission from the target network entity earlier and/or to reduce interruption time caused by handover.

In some embodiments, the synchronization request may be received from the source network entity during its attachment. In some embodiments, the synchronization request may be received in a measurement configuration from the source network entity. The measurement configuration may further include neighbor cells to measure, when to measure (e.g., when a signal from the source network entity is below a threshold), etc. In some embodiments, the synchronization request may be received in a RRC configuration message. In some embodiments, the synchronization request may be received during a setup procedure of at least one radio bearer with the source network entity. For example, the user equipment may receive the synchronization request in a message exchanged at 401, 501, and/or 601 shown in FIGS. 4, 5, and 6, respectively.

Based on the synchronization request, the user equipment may acquire downlink synchronization information of the at least neighboring network entity, prior to receiving the handover command. For example, during performing neighbor network measurements for mobility, the user equipment may acquire downlink synchronization information of at least one measured neighbor network entity, which may include, e.g., downlink frame timing, subframe timing, and/or symbol timings of the at least one measured network entity. In some embodiments, the user equipment may save the physical broadcasting channel (PBCH) of the measured network entity during measurements, and upon receiving a handover command, the user equipment determines the frame, subframe and/or symbol timings from the saved PBCH of the target network entity.

In some embodiments, the handover command received at 1003 may comprises at least one indication indicating that downlink data delivery from the target network entity is to occur during a handover procedure.

In some embodiments, the dedicated downlink transmission monitored by the UE at 1005 may be addressed to a cell radio network temporary identifier allocated to the user equipment by the target network entity. The cell radio network temporary identifier may be included in the handover command received at 1003.

In some embodiments, UE, at 1009, may transmit feedback for downlink data received during the handover procedure to the target network entity after the handover procedure is completed. In some embodiments, the feedback may comprise an automatic repeat request (ARQ) feedback and/or a hybrid automatic repeat request (HARQ)

Figure 11:
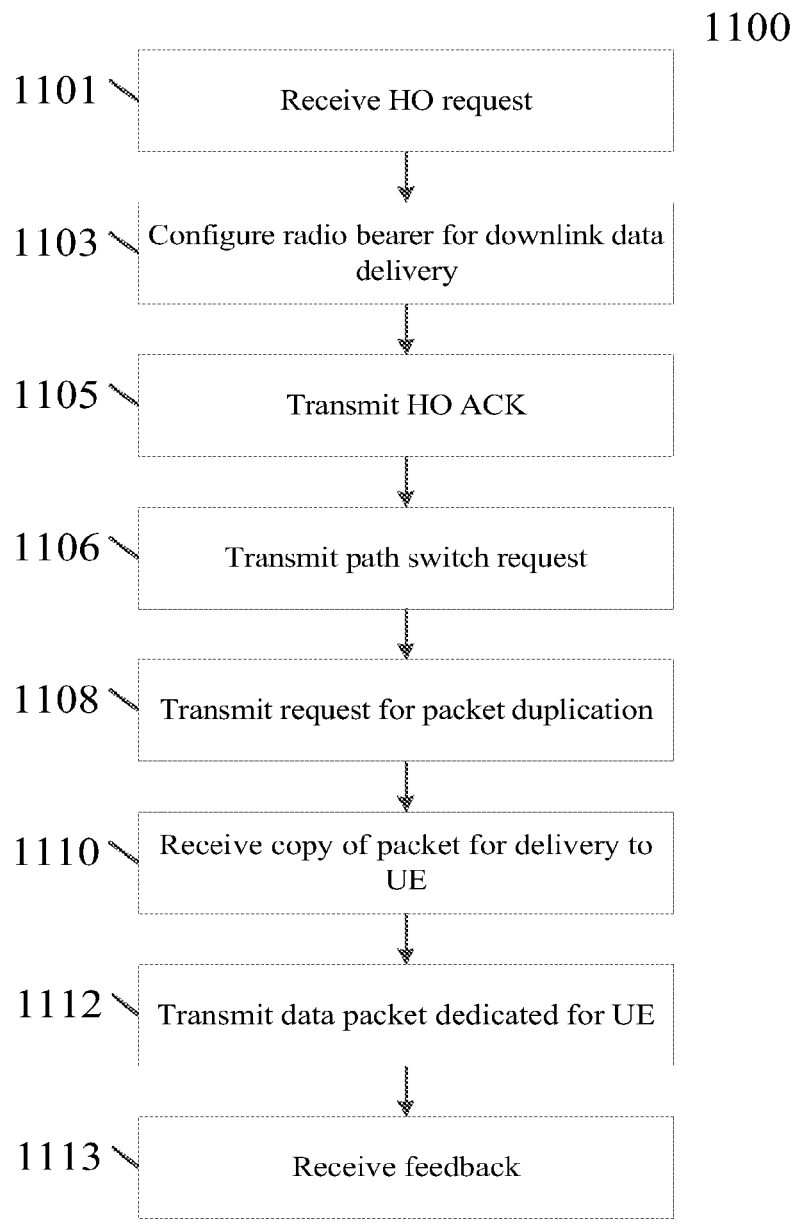
FIG. 11 illustrates another example of a flow diagram of a method according to some embodiments.

FIG. 11 illustrates an example of a flow diagram of a method 1100 that may be performed by a first network entity, such as NE 1420 illustrated in FIG. 14, according to various embodiments. At 1101, the first network entity may receive, from a second network entity, a handover request for a user equipment indicating that downlink data delivery during a handover procedure should be configured by the first network entity for the user equipment. In some embodiments, the first network entity may comprise at least one centralized unit and at least one distributed unit. In some embodiments, the at least one centralized unit may be shared with the second network entity.

In some embodiments, additionally or alternatively, the handover request may also include at least one measurement report associated with the first network entity from the user equipment.

At 1103, the first network entity may configure at least one radio bearer for the downlink data delivery during the handover procedure of the user equipment. At 1105, the first network entity may transmit a handover acknowledgement to the second network entity. In various embodiments, the handover acknowledgement may indicate successful configuration of the downlink data delivery at the first network entity. Additionally or alternatively, the handover acknowledgement may comprise a cell radio network temporary identifier allocated for the user equipment.

At 1112, the first network entity may transmit at least one data packet dedicated for the user equipment to the user equipment, prior to receiving any uplink signal from the user equipment. That is, the data transmission to the user equipment may occur during the handover procedure, i.e., prior to completion of the handover procedure. In some embodiments, the data transmission to the user equipment can be performed prior to receiving a PRACH preamble from the user equipment. Thus, in some embodiments, the data transmission to the user equipment may be performed before uplink synchronization of the user equipment is achieved. In this way, interruption of user traffic due to handover delay may be reduced.

In some embodiments, the method may include an operation shown in block 1113. At 1113, after completion of the handover procedure, the first network entity may receive from the user equipment at least one feedback (e.g., HARQ or ARQ feedback) for the at least one data packet.

In some embodiments, the method may include an operation shown in block 1106. At 1106, the first network entity may transmit, after transmitting the handover acknowledgement, at least one path switch request to a controlling unit, e.g., a user plane function. Alternatively, in some embodiments, at 1108, the first network entity may transmit, to a controlling unit (e.g., a user plane function unit), a request for packet duplication for the user equipment. Alternatively, at 1110, in some embodiments, the first network entity may receive a copy of a packet for delivering to the user equipment from the second network entity.

Figure 12:
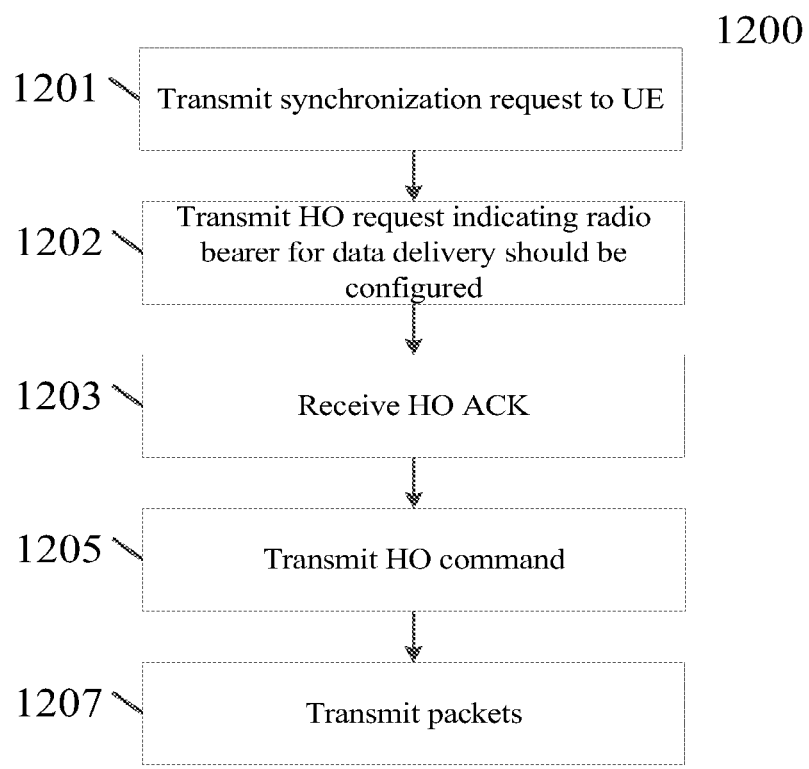
FIG. 12 illustrates another example of a flow diagram of a method according to certain embodiments.

FIG. 12 illustrates an example of a flow diagram of a method 1200 that may be performed by a source network entity, such as NE 1420 illustrated in FIG. 14, according to various embodiments. At 1202, the source network entity may transmit, to a target network entity, a handover request indicating that at least one radio bearer for data delivery from the target network entity to a user equipment during a handover procedure of the user equipment should be configured. In some embodiments, the handover request may further include a measurement report associated with the target network entity from the user equipment. At 1203, the source network entity may receive at least one handover acknowledgement from the target network entity. At 1205, the source network entity may transmit a handover command to the user equipment. In various embodiments, the handover command may include a configuration for the data delivery from the target network entity to the user equipment during a handover procedure. In some embodiments, the handover command may include an identifier for the user equipment allocated by the target network entity. In some embodiments, the method may include operation of block 1207. At 1207, the source network entity may transmit packets for the user equipment to the target network entity.

In some embodiments, the method may further comprise a block 1201, where the source network entity may transmit a synchronization request to the user equipment. The synchronization request requests the user equipment to obtain downlink synchronization information of at least one neighboring network entity. Examples for sending the synchronization request have been described with reference to FIG. 10 and also apply here, so they will not be repeated here.

Figure 13:
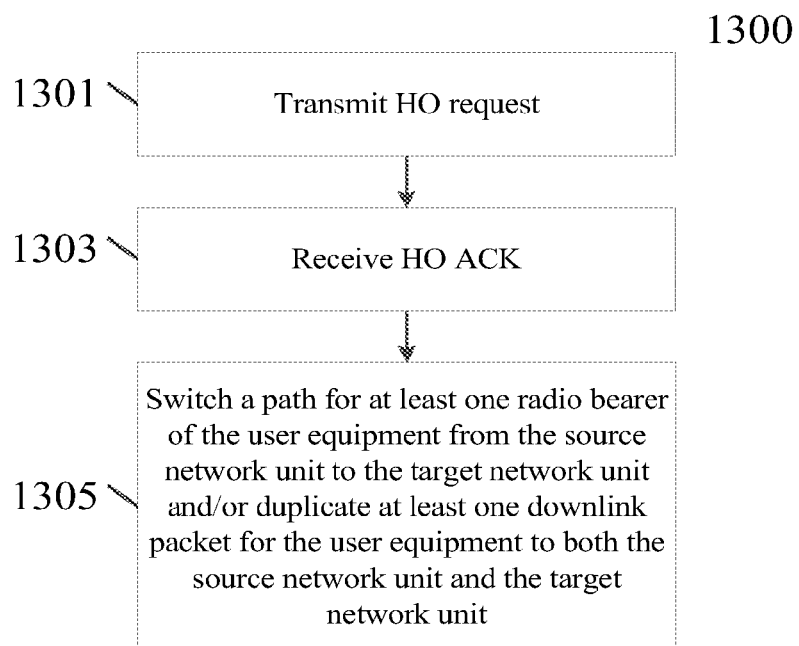
FIG. 13 illustrates another example of a flow diagram of a method according to various embodiments.

FIG. 13 illustrates an example of a flow diagram of a method 1300 that may be performed by a control unit, such as NE 1420 illustrated in FIG. 14, according to various embodiments. In some embodiments, the control unit may be a CU. At 1301, the control unit, connected to both a source network unit and a target network unit, may send a handover request to the target network unit. In certain embodiments, the handover request may indicate a request for a handover of a user equipment from the source network unit to the target network unit. In some embodiments, the HO request may indicate to the target network unit that downlink data delivery from the target network unit to the user equipment during handover procedure should be configured. In some embodiments, the HO request may include measurement report associated with the target network unit from the user equipment. At 1303, the control unit may receive, from the target network unit, an acknowledgement to the handover request. In some embodiments, the acknowledgement may include an identifier (e.g., a cell -radio network temporary identity) allocated for the user equipment by the target network entity. In response to the acknowledgment, the control unit may, at 1305, switch a path for at least one radio bearer of the user equipment from the source network unit to the target network unit and/or duplicate at least one downlink packet for the user equipment to both the source network unit and the target network unit.

It should be appreciated that although many blocks of operations are illustrated in FIGS. 7-13, some blocks are not necessary in some embodiments, and can be omitted.

FIG. 14 illustrates an example of a system according to certain example embodiments. In one example embodiment, a system may include multiple devices, such as, for example, UE 1410 and/or NE 1420.

UE 1410 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, subscriber station, wireless terminal, tablet, IoT device, NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or any combination thereof.

NE 1420 may be one or more of a base station, such as an eNB or gNB, a serving gateway, a server, a controlling device and/or any other network node or combination thereof. Furthermore, UE 1410 and/or NE 1420 may be one or more of a citizens broadband radio service device (CBSD).

NE 1420 may further comprise at least one CU (e.g., a gNB-CU), which may be associated with at least one DU (e.g., gNB-DU). The at least one CU and the at least one DU may be in communication via at least one F1 interface, at least one $X_n$-C interface, and/or at least one NG interface via a 5GC, or any other interfaces.

UE 1410 and/or UE NE 1420 may include at least one processor, respectively indicated as 1411 and 1421. Processors 1411 and 1421 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1412 and 1422. The memory may be fixed or removable. The memory may include computer program instructions or computer code contained therein. Memories 1412 and 1422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1411 and 1421, memories 1412 and 1422, and any subset thereof, may be configured to provide means corresponding to the various blocks of FIGS. 4-13. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 14, transceivers 1413 and 1423 may be provided, and one or more devices may also include at least one antenna, respectively illustrated as 1414 and 1424. The device may have many antennas, such as an array of antennas configured for multiple input multiple output (MIMO) communications, or multiple antennas for multiple RATs. Other configurations of these devices, for example, may be provided. Transceivers 1413 and 1423 may be a transmitter, a receiver, both a transmitter and a receiver, or a unit or device that may be configured both for transmission and reception.

The memory and the computer program instructions may be configured, with the processor for the particular device, to cause the device, such as UE, to perform any of the processes described above (i.e., FIGS. 4-13). Therefore, in certain embodiments, a non-transitory computer-readable medium may be encoded with computer instructions that, when executed in hardware, cause an apparatus to perform a process such as one of the processes described herein. Alternatively, certain embodiments may be performed entirely in hardware.

In certain embodiments, an apparatus may include circuitry configured to perform any of the processes or functions illustrated in FIGS. 4-13. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 15:
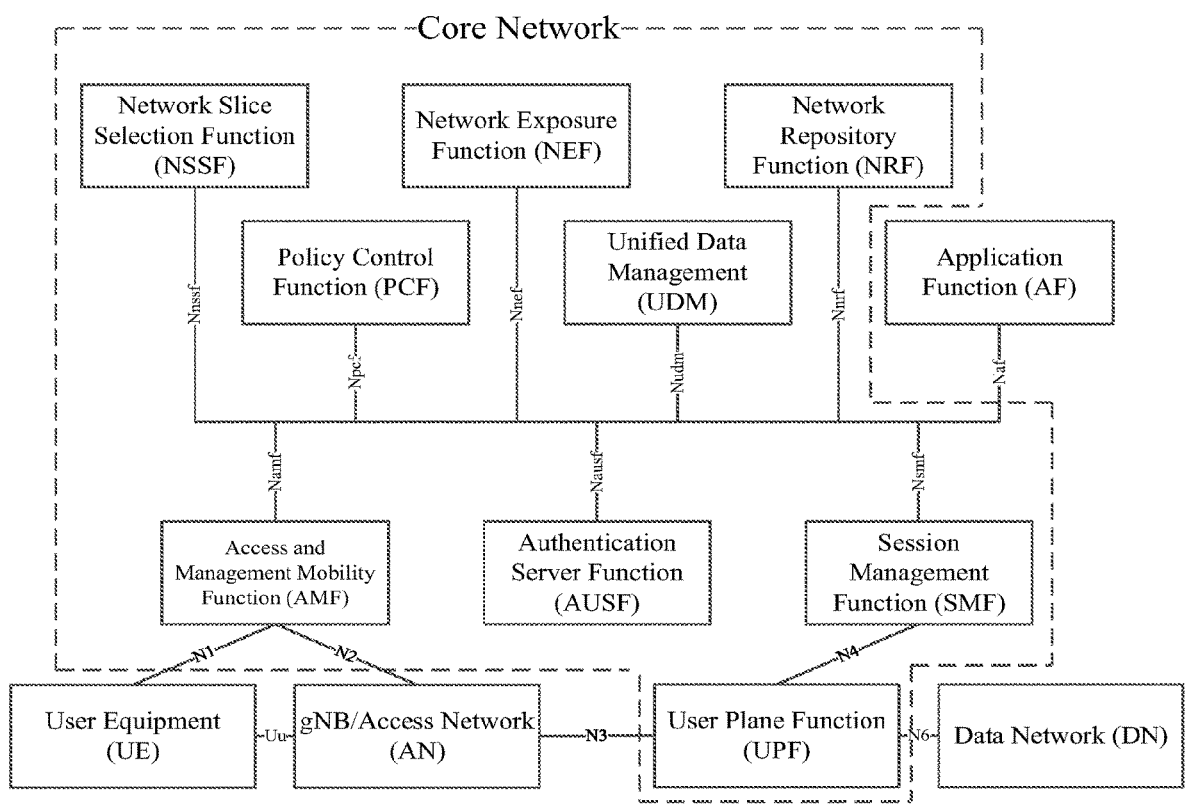
FIG. 15 illustrates an example of a network and system architecture according to certain embodiments.

FIG. 15 illustrates an example of a communication network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 15 may be similar to UE 1410 and NE 1420, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary
3GPP Third Generation Partnership Project
5G Fifth Generation
5GC Fifth Generation Core
5GS Fifth Generation System
5QI Fifth Generation Quality of Service Indicator
ACK Acknowledgement
AMF Access and Mobility Management Function
ARQ Automatic Repeat Request
ASIC Application Specific Integrated Circuit
BS Base Station
CBSD Citizens Broadband Radio Service Device
CHO Conditional Handover
CN Core Network
CPU Central Processing Unit
CU Centralized Unit
DAPS Dual Active Protocol Stack
DC Dual Connectivity
DCCH Dedicated Control Channel
DCI Downlink Control Information
DDDS Downlink Data Delivery Status
DL Downlink
DMRS Demodulation Reference Signal
DRB Data Radio Bearer
DU Distributed Unit
eMBB Enhanced Mobile Broadband
eMTC Enhanced Machine Type Communication
eNB Evolved Node B
eOLLA Enhanced Outer Loop Link Adaptation
EPS Evolved Packet System
gNB Next Generation Node B
GPS Global Positioning System
HARQ Hybrid Automatic Repeat Request
HDD Hard Disk Drive
IIoT Industrial Internet of Things
IoT Internet of Things
LTE Long-Term Evolution
LTE-A Long-Term Evolution Advanced
MAC Medium Access Control
MBS Multicast and Broadcast Systems
MCS Modulation and Coding Scheme
MEMS Micro Electrical Mechanical System
MIMO Multiple Input Multiple Output
MME Mobility Management Entity
mMTC Massive Machine Type Communication
MPDCCH Machine Type Communication Physical Downlink Control Channel
MTC Machine Type Communication
NACK Negative Acknowledgement
NAS Non-Access Stratum
NB-IoT Narrowband Internet of Things
NE Network Entity
NG Next Generation
NG-eNB Next Generation Evolved Node B
NG-RAN Next Generation Radio Access Network
NR New Radio
NR-U New Radio Unlicensed
OFDM Orthogonal Frequency Division Multiplexing
OLLA Outer Loop Link Adaptation
PDA Personal Digital Assistance
PDCCH Physical Downlink Control Channel
PDSCH Physical Downlink Shared Channel
PDU Protocol Data Unit
PHY Physical
PRACH Physical Random Access Channel
PRB Physical Resource Block
P-RNTI Paging Radio Network Temporary Identifier
PUCCH Physical Uplink Control Channel
PUSCH Physical Uplink Shared Channel
QoS Quality of Service
RACH Random Access Channel
RAM Random Access Memory
RAN Radio Access Network
RAT Radio Access Technology
RLC Radio Link Control
RLC AM Radio Link Control Acknowledgement Mode
RLF Radio Link Failure
RNTI Radio Network Temporary Identifier
RRC Radio Resource Control
RSRP Reference Signal Received Power
SI System Information
SMF Session Management Function
SRB Signaling Radio Bearer
TSN Time Sensitive Network
Tx Transmission
UCI Uplink Control Information UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

I claim:

1. An apparatus, comprising: at least one processor; and
at least one memory including computer program code, wherein the at least one memory and the computer program code are configured to, with the at least one processor, cause the apparatus at least to:
receive a synchronization request from a source network entity prior to receiving a handover command, the synchronization request requesting the apparatus to acquire downlink synchronization information of at least one neighboring network entity including a target network entity;
wherein both the source network entity and the target network entity include a centralized unit (CU) and a distributed unit (DU),
transmit Radio Resource Control (RRC) Reconfiguration messages to the source network entity-DU (NE-DU), which is transmitted to a user equipment apparatus (UE);
receive system information (SI), physical downlink control channel (PDCCH) and/or physical downlink shared channel (PDSCH), configurations of the target NE-DU, and a cell-radio network temporary identity allocated by the target NE-DU;
acquire downlink synchronization information of the at least one neighboring network entity based on the synchronization request, prior to receiving the handover command;
receive the handover command from the source network entity, wherein the handover command comprises at least one indication indicating that downlink data delivery from the target network entity is to occur during a handover procedure;
based on the received handover command, monitor at least one dedicated downlink transmission from the target network entity prior to transmitting any uplink signal to the target network entity;
transmitting a PRACH preamble to initiate uplink synchronization with the target network entity;
transmit at least one request for an interruption free handover to the source network entity, wherein the at least one request is transmitted during a setup procedure of at least one radio bearer with the source network entity, wherein the radio bearer is for Industrial Internet of Things (IIOT) traffic;
perform uplink synchronization with the target network entity, wherein the monitoring starts prior to completion of uplink synchronization;
transmit by the target NE-DU a packet to the UE over a PDSCH, wherein target NE-DU uses a best beam reported by the UE in a measurement report and forwarded by the CU in the handover preparation message;
transmit by the target NE-DU the packet over multiple beams, as reported by the UE in the measurement report; and
perform by the target NE-DU hybrid automatic repeat request (HARQ) retransmissions of the packet, prior to receiving HARQ feedback from the UE;
continue retransmission by the target NE-DU of the packet until any of:
a delivery deadline expires,
an estimated maximum number of required retransmissions for successful delivery is completed,
target NE-DU receives a HARQ ACK for the transmission, after the UE has completed its RACH procedure, or
the UE transmits RLC status reports indicating successful transmission after the RRC Reconfiguration Complete message has been sent.

2. The apparatus of claim 1, wherein the at least one memory and the computer program code are further configured to, with the at least one processor, cause the apparatus to:
transmit, to the target network entity, at least one feedback for downlink data received during a handover procedure performed according to the handover command, after the handover procedure is completed.

* * * * *